(12) United States Patent
Guo et al.

(10) Patent No.: US 12,087,333 B2
(45) Date of Patent: Sep. 10, 2024

(54) HARD DISK FIXING APPARATUS, HARD DISK CAGE AND DEVICE HAVING STORAGE FUNCTION

(71) Applicant: SHANGHAI MORUAN TELECOM TECHNOLOGY CO., LTD., Shanghai (CN)

(72) Inventors: Yuhua Guo, Shanghai (CN); Xin Chen, Shanghai (CN)

(73) Assignee: SHANGHAI MORUAN TELECOM TECHNOLOGY CO., LTD., Shanghai (CN)

(*) Notice: Subject to any disclaimer, the term of this patent is extended or adjusted under 35 U.S.C. 154(b) by 226 days.

(21) Appl. No.: 17/785,226

(22) PCT Filed: Dec. 31, 2020

(86) PCT No.: PCT/CN2020/142413
§ 371 (c)(1),
(2) Date: Jun. 14, 2022

(87) PCT Pub. No.: WO2021/159888
PCT Pub. Date: Aug. 19, 2021

(65) Prior Publication Data
US 2023/0026051 A1 Jan. 26, 2023

(30) Foreign Application Priority Data
Feb. 12, 2020 (CN) .......................... 202010088198.9

(51) Int. Cl.
*G11B 33/12* (2006.01)
*G11B 33/04* (2006.01)

(52) U.S. Cl.
CPC ........ *G11B 33/0438* (2013.01); *G11B 33/128* (2013.01)

(58) Field of Classification Search
CPC .. G11B 33/0438; G11B 33/128; Y02D 10/00; G06F 1/187
See application file for complete search history.

(56) References Cited

U.S. PATENT DOCUMENTS

| 5,229,919 | A | 7/1993 | Chen |
| 7,190,575 | B1* | 3/2007 | Baik ................... G06F 1/187 |
| 2018/0265263 | A1* | 9/2018 | Li ..................... B65D 43/0202 |

FOREIGN PATENT DOCUMENTS

| CN | 101430588 A | 5/2009 |
| CN | 102937827 A | 2/2013 |

(Continued)

OTHER PUBLICATIONS

Office action issued on Jul. 4, 2023 from Japan Intellectual Property Office in a counterpart Japanese Patent Application No. 2022-561220 (English translation is also submitted herewith.).

(Continued)

*Primary Examiner* — Anthony Q Edwards
*Assistant Examiner* — Hung Q Dang
(74) *Attorney, Agent, or Firm* — The PL Law Group, PLLC (57) ABSTRACT

A hard disk fixing device according to an embodiment of the present disclosure includes a hard disk box, a baffle and a snap. A first end of the baffle is rotatably installed on a first side edge of the hard disk box, a first end of the snap is rotatably installed on a second side edge of the hard disk box, and a second end of the snap is engaged with a second end of the baffle. As such, the hard disk box, the snap and the baffle form an accommodating cavity to limit a hard disk, and the accommodating cavity can accommodate the hard disk.

9 Claims, 9 Drawing Sheets

(56) References Cited

FOREIGN PATENT DOCUMENTS

| CN | 103176518 | A | | 6/2013 | |
|---|---|---|---|---|---|
| CN | 205068252 | U | | 3/2016 | |
| CN | 109426311 | | * | 3/2019 | ............ G06F 1/187 |
| CN | 208954024 | U | | 6/2019 | |
| CN | 111258390 | A | | 6/2020 | |
| JP | 3079145 | U | | 8/2001 | |
| JP | 3159998 | U | | 6/2010 | |
| JP | 2015-219933 | A | | 12/2015 | |
| JP | 2018-113086 | A | | 7/2018 | |

OTHER PUBLICATIONS

International Search Report for PCT/CN2020/142413 mailed on Mar. 30, 2021.

* cited by examiner

HARD DISK FIXING APPARATUS, HARD DISK CAGE AND DEVICE HAVING STORAGE FUNCTION

CROSS-REFERENCE TO RELATED APPLICATIONS AND CLAIM OF PRIORITY

This application claims benefit under 35 U.S.C. 119, 120, 121, or 365(c), and is a National Stage entry from International Application No. PCT/CN2020/142413, filed Dec. 31, 2020, which claims priority to the benefit of Chinese Patent Application No. 202010088198.9 filed in the Chinese Intellectual Property Office on Feb. 12, 2020, the entire contents of which are incorporated herein by reference.

BACKGROUND

1. Technical Field

The present application relates to the technical field of storage device fixing, and more specifically, to a hard disk fixing device, a hard disk cage and an apparatus having a storage function.

2. Background of the Invention

With the development of information technology, various information files keep increasing. To meet the large-capacity storage of information files, a considerable number of hard disks are installed in electronic devices such as storage servers, computers and the like.

At present, the hard disk is mainly fixed on a hard disk holder by screws. That is, the hard disk and the hard disk holder are respectively provided with threaded holes, and the screws are threadedly connected with the threaded holes on the hard disk and the hard disk holder, respectively, so as to fix the hard disk on the hard disk holder.

However, generally a single hard disk requires at least two screws to fix it. When installing and removing the hard disk for maintenance and replacement, screws need to be assembled and disassembled one by one by means of an auxiliary tool such as a screwdriver, which is cumbersome, time-consuming and low in work efficiency.

SUMMARY

The present application provides a hard disk fixing device, a hard disk cage and an apparatus with a storage function, so as to solve the above technical problem, i.e., when installing and removing an existing hard disk for maintenance and replacement, screws need to be assembled and disassembled one by one by means of an auxiliary tool such as a screwdriver, which is cumbersome, time-consuming and low in work efficiency.

To solve the above problem, the present application adopts technical solutions as below:

A first aspect of the present application provides a hard disk fixing device, comprising:

a hard disk box, wherein one side of the hard disk box is provided with an installation opening, as well as a first side edge and a second side edge which are oppositely arranged and spaced by the installation opening;

a baffle, wherein a first end of the baffle is rotatably installed on the first side edge; and a snap, wherein a first end of the snap is rotatably installed on the second side edge, and a second end of the snap is engaged with a second end of the baffle, such that the hard disk box, the baffle and the snap form an accommodating cavity that can accommodate a hard disk.

The hard disk fixing device provided in the first aspect of the present application has the following advantages:

The hard disk fixing device of the present application comprises a hard disk box, a baffle and a snap. A first end of the baffle is rotatably installed on a first side edge of the hard disk box, a first end of the snap is rotatably installed on a second side edge of the hard disk box, and a second end of the snap is engaged with a second end of the baffle. As such, the hard disk box, the snap and the baffle form an accommodating cavity to limit the hard disk, and the accommodating cavity can accommodate the hard disk, thereby fixing the hard disk. When the hard disk needs to be removed, simply by disengaging the second end of the snap from the second end of the baffle, the hard disk can be removed from the hard disk box. Therefore, the operation is simple, convenient, time-saving, effortless and high-efficiency.

In one embodiment, the hard disk fixing device further comprises at least one separator, the separator is installed in the accommodating cavity and divides the accommodating cavity into at least two accommodating sub-cavities, and the accommodating sub-cavity can accommodate the hard disk.

In one embodiment, the hard disk box comprises a first side plate and a second side plate which face each other with a space therebetween; the separator comprises at least two elastic shafts, the at least two elastic shafts being arranged with a space therebetween along a first preset direction; two ends of the elastic shaft are connected with the first side plate and the second side plate, respectively; and under the action of the elastic force of the elastic shafts, the hard disk can be clamped in the accommodating sub-cavity.

In one embodiment, the elastic shaft comprises a rotating shaft and an elastic sleeve sleeved on the outer side of the rotating shaft, wherein two ends of the rotating shaft are connected with the first side plate and the second side plate, respectively.

In one embodiment, the elastic sleeve is rotatably sleeved on the outer side of the rotating shaft, and two ends of the rotating shaft are firmly connected with the first side plate and the second side plate, respectively; or, the first side plate is provided with a first installation hole, the second side plate is provided with a second installation hole, and two ends of the rotating shaft are rotatably installed in the first installation hole and the second installation hole, respectively.

In one embodiment, a plurality of separators are provided, wherein the plurality of separators are arranged with a space therebetween along a second preset direction; and the second preset direction is perpendicular to the first preset direction.

In one embodiment, the first side edge is hinged with the first end of the baffle; and/or the second side edge is hinged with the first end of the snap.

In one embodiment, one of the second end of the snap and the second end of the baffle is a hook, and the other of the second end of the snap and the second end of the baffle is a snap which is engaged with the hook.

In one embodiment, the baffle is provided with an avoiding opening to avoid a hard disk connector.

A second aspect of the present application provides a hard disk cage, which comprises a hard disk fixing device according to the first aspect and at least one hard disk, wherein the hard disk is accommodated in an accommodating cavity of the hard disk fixing device.

As comprising a hard disk fixing device according to the first aspect of the present application, the hard disk cage provided in the second aspect also has the same advantages as the hard disk fixing device according to the first aspect.

A third aspect of the present application provides an apparatus having a storage function, which comprises a chassis and a hard disk cage according to the second aspect, wherein the hard disk cage is fixed in the chassis.

As comprising a hard disk cage according to the second aspect of the present application, the apparatus having a storage function according to the third aspect also has the same advantages as the hard disk cage according to the second aspect.

Besides the technical problem to be solved by the present application, the technical features forming the technical solutions as well as the beneficial effects brought about by the technical features of these technical solutions as described above, other technical problems that can be solved by the hard disk fixing device, hard disk cage and apparatus having a storage function provided in the present application, other technical features included in the technical solutions as well as beneficial effects brought about by these technical features will be further explained in detail in the detailed description.

BRIEF DESCRIPTION OF THE DRAWINGS

In order to more clearly illustrate the technical solutions in the embodiments of the present application, a brief introduction is presented below to the accompanying drawings used in the description of the embodiments. Obviously, the accompanying drawings in the following description are merely part of the embodiments of the present application, and these drawings and text description do not limit the scope of the idea of the present disclosure in any way but illustrate the concept of the present disclosure by referring to specific embodiments. Those of ordinary skill in the art can further obtain other drawings from these drawings without the exercise of any creative effort.

DETAILED DESCRIPTION

The hard disk is the main storage medium in a computer and server (e.g., a storage server). For example, the operating system in the computer and data in the server are both stored in the hard disk. At present, there are two fixing ways for hard disks. For details, please see FIG. 1 and FIG. 2.

Figure 1:
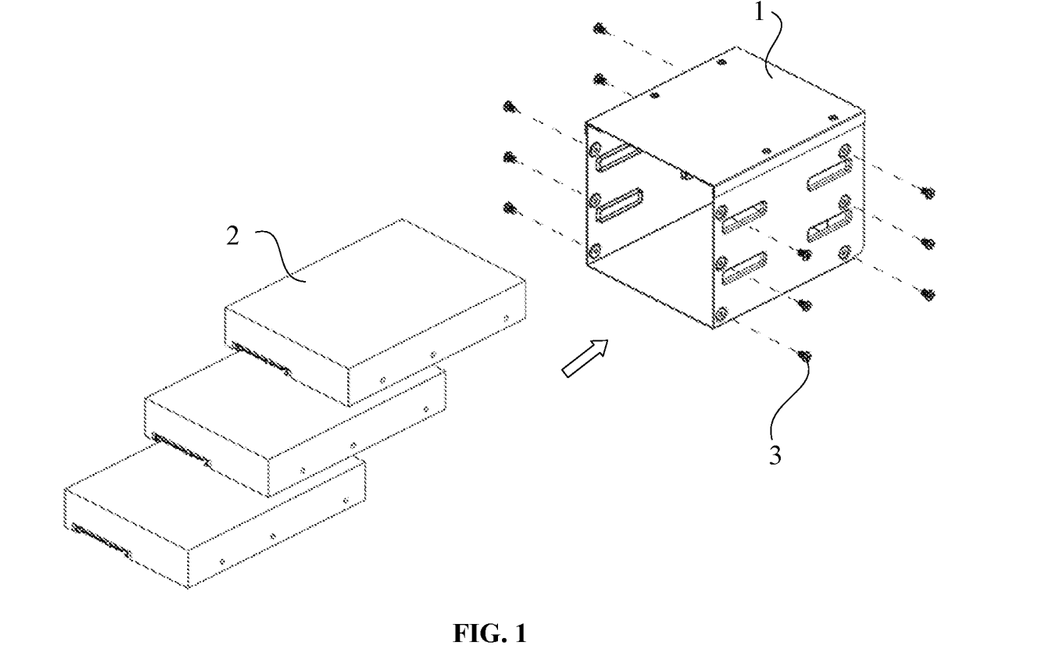
FIG. 1 shows a structural schematic view of one hard disk fixing way in some circumstances.

With reference to FIG. 1, a hard disk holder 1 and a hard disk 2 are provided with threaded holes respectively. The hard disk 2 is installed in the hard disk holder 1. Threaded holes on side surfaces of the hard disk holder 1 are aligned with threaded holes on the hard disk 1. Screws 3 are tightened in the threaded holes on the hard disk holder 1 and the hard disk 2 by using an auxiliary tool such as a screwdriver. With this fixing method, a single hard disk 2 usually needs at least two screws 3. When installing, maintaining and replacing the hard disk 2, it is necessary to use an auxiliary tool such as a screwdriver to install and remove the screws 3, which is time-consuming, cumbersome and low in disassembly efficiency. When the chassis has a limited operating space, the hard disk holder 1 has to be removed from the chassis, in order to remove and install the hard disk.

Figure 2:
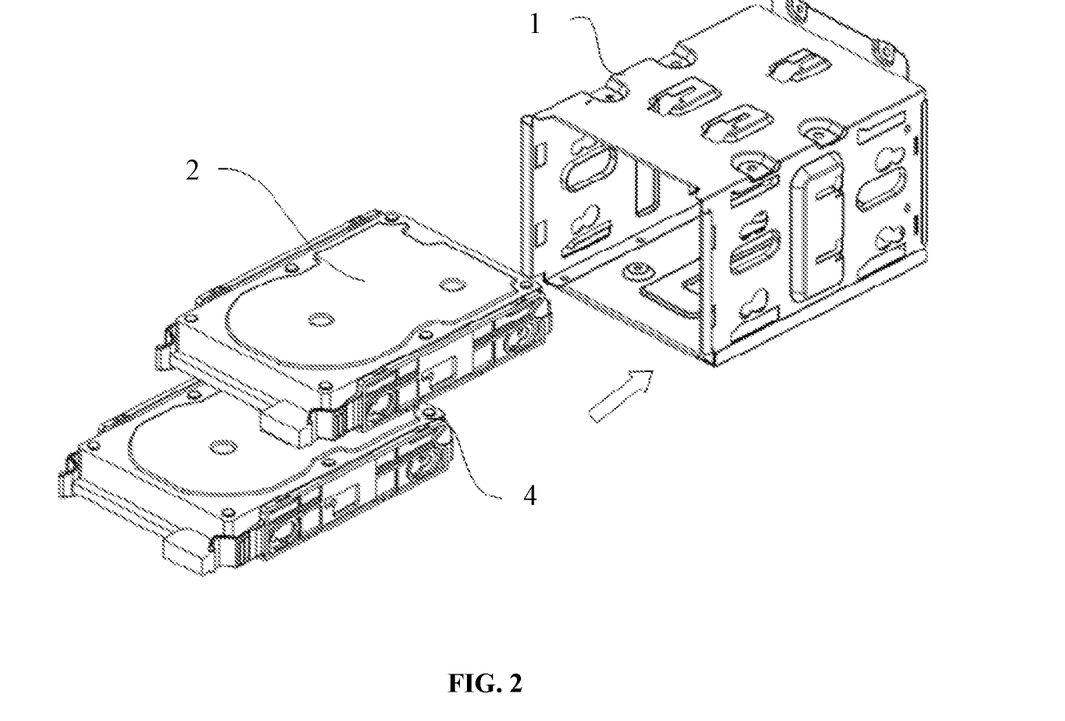
FIG. 2 shows a structural schematic view of another hard disk fixing way in some circumstances.

With reference to FIG. 2, the hard disk 2 is fixed on the hard disk holder 1 through a hard disk bracket 4. Specifically, first the hard disk 2 is fixed to the hard disk bracket 4 through pins, then the hard disk bracket 4 snaps into the hard disk holder 1, and finally the hard disk bracket 4 is engaged with the hard disk holder 1. The assembly operation is cumbersome, which leads to low efficiency and makes it impossible to fast maintain and replace the hard disk. Moreover, the installation and operation for adding the hard disk bracket 4 takes space, which is not suitable for a compact chassis. In addition, the addition of the hard disk bracket 4 increases the cost of the whole apparatus.

To this end, the present application provides a hard disk fixing device, a hard disk cage and an apparatus with a storage function, wherein the hard disk fixing device comprises a hard disk box, a baffle and a snap. A first end of the baffle is rotatably installed on a first side edge of the hard disk box, a first end of the snap is rotatably installed on a second side edge of the hard disk box, and a second end of the snap is engaged with a second end of the baffle. As such, the hard disk box, the snap and the baffle form an accommodating cavity to limit the hard disk within the accommodating cavity, and the accommodating cavity can accommodate the hard disk, thereby fixing the hard disk. When the hard disk needs to be removed, simply by disengaging the second end of the snap from the second end of the baffle, the hard disk can be removed from the hard disk box. Therefore, the operation is simple, convenient, time-saving, effortless and high-efficiency.

A detailed description is presented below to the embodiments of the present application. Examples of the embodiments are shown in the figures, wherein the same or similar numerals denote the same or similar elements or elements having the same or similar functions throughout the figures. The embodiments to be described with reference to the figures are exemplary and intended to explain the present application rather than limiting.

Figure 3:
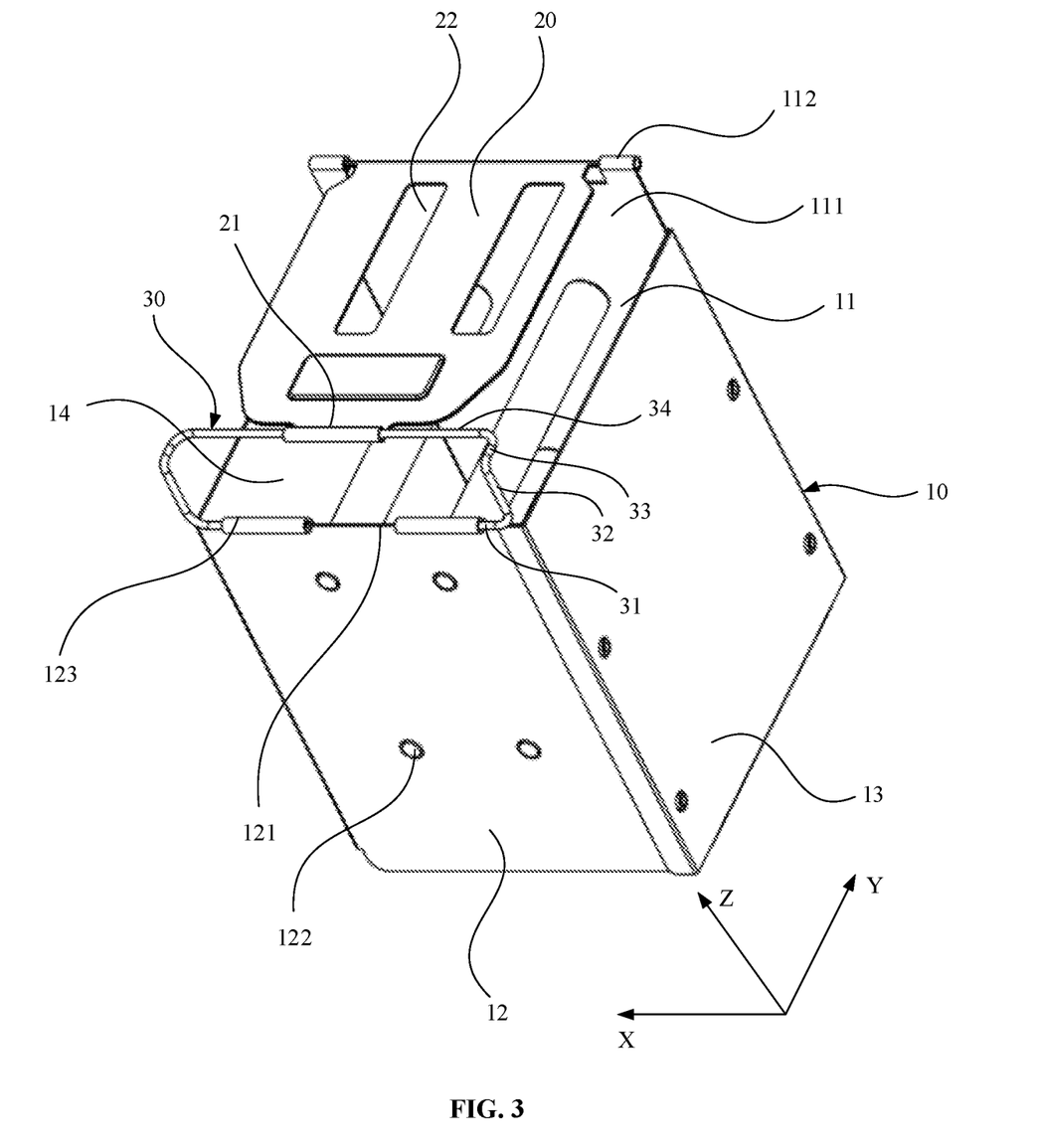
FIG. 3 shows a structural schematic view of a hard disk fixing device provided in an embodiment of the present disclosure.

With reference to FIG. 3, the present application provides a hard disk fixing device, which comprises a hard disk box 10, a baffle 20 and a snap 30; wherein one side of the hard disk box 10 has an installation opening, and a first side edge 111 and a second side edge 121 which are oppositely arranged and spaced by the installation opening; a first end of the baffle 20 is rotatably installed on the first side edge 111; a first end of the snap 30 is rotatably installed on the second side edge 121, and a second end of the snap 30 is engaged with a second end of the baffle 20, such that the hard disk box 10, the baffle 20 and the snap 30 form an accommodating cavity that can accommodate a hard disk 2.

In the present embodiment, the hard disk box 10 may be a rectangular structure, which comprises a rectangular bottom plate and four side plates arranged on the bottom plate. The four side plates include a first side plate 11, a second side plate 12, a third side plate 13 and a fourth side plate 14, wherein the first side plate 11 and the second side plate 12 face each other with a space therebetween along direction Y in the figure, and the third side plate 13 and the fourth side plate 14 face each other with a space therebetween along direction X in the figure. The bottom plate of the hard disk box 10 may be welded or riveted with the four side plates. The top of the hard disk box 10 has an installation opening, the top end of the first side plate 11 forms the first side edge 111, and the top end of the second side plate 12 forms the second side edge 121.

The baffle 20 may be a rectangular plate or an irregularly shaped plate, a first end of which is rotatably installed on the first side edge 111. For example, the first end of the baffle 20 and the first side edge 111 each are provided with a hinge sleeve, a hinge shaft penetrates the hinge sleeves on the baffle 20 and the first side edge 111, so that the baffle 20 can rotate relative to the hard disk box 10. For another example, the first end of the baffle 20 and the first side edge 111 are hinged through a hinge, so that the baffle can rotate relative to the hard disk box 10.

The first end of the snap 30 is rotatably installed on the second side edge 121. For example, the first end of the snap 30 and the second side edge 121 each are provided with a hinge sleeve, a hinge shaft penetrates the hinge sleeves on the snap 30 and the second side edge 121, so that the snap 30 can rotate relative to the hard disk box 10. For another example, the first end of the snap 30 and the second side edge 121 are hinged through a hinge, so that the snap 30 can rotate relative to the hard disk box 10.

The second end of the snap 30 is engaged with the second end of the baffle 20. For the second end of the snap 30 is provided with a snap, and the second end of the baffle 20 is provided with a hook engaged with the snap. For another example, the second end of the snap 30 is provided with a jaw, and the second end of the baffle 20 is provided with a slot engaged with the jaw. For still another example, the second end of the snap 30 is provided with a snap convex, and the second end of the baffle 20 is provided with a snap recess engaged with the snap convex. There are many engagement ways for the snap 30 and the baffle 20, which are not limited here.

The hard disk box 10, the baffle 20 and the snap 30 form an accommodating cavity, which can accommodate the hard disk 2. Further, the hard disk may be clamped in the accommodating cavity. For example, the inner sides of the first side plate 11 and the second side plate 12 are provided with rubber slides respectively. Under the action of the elastic force of the rubber slides, the hard disk 2 is clamped in the accommodating cavity. For another example, an elastic separation plate is arranged in the accommodating cavity to divide the accommodating cavity into two sub-cavities, and the hard disk 2 is tightly clamped by the elastic separation plate and the side plate of the hard disk box 10.

Figure 5:
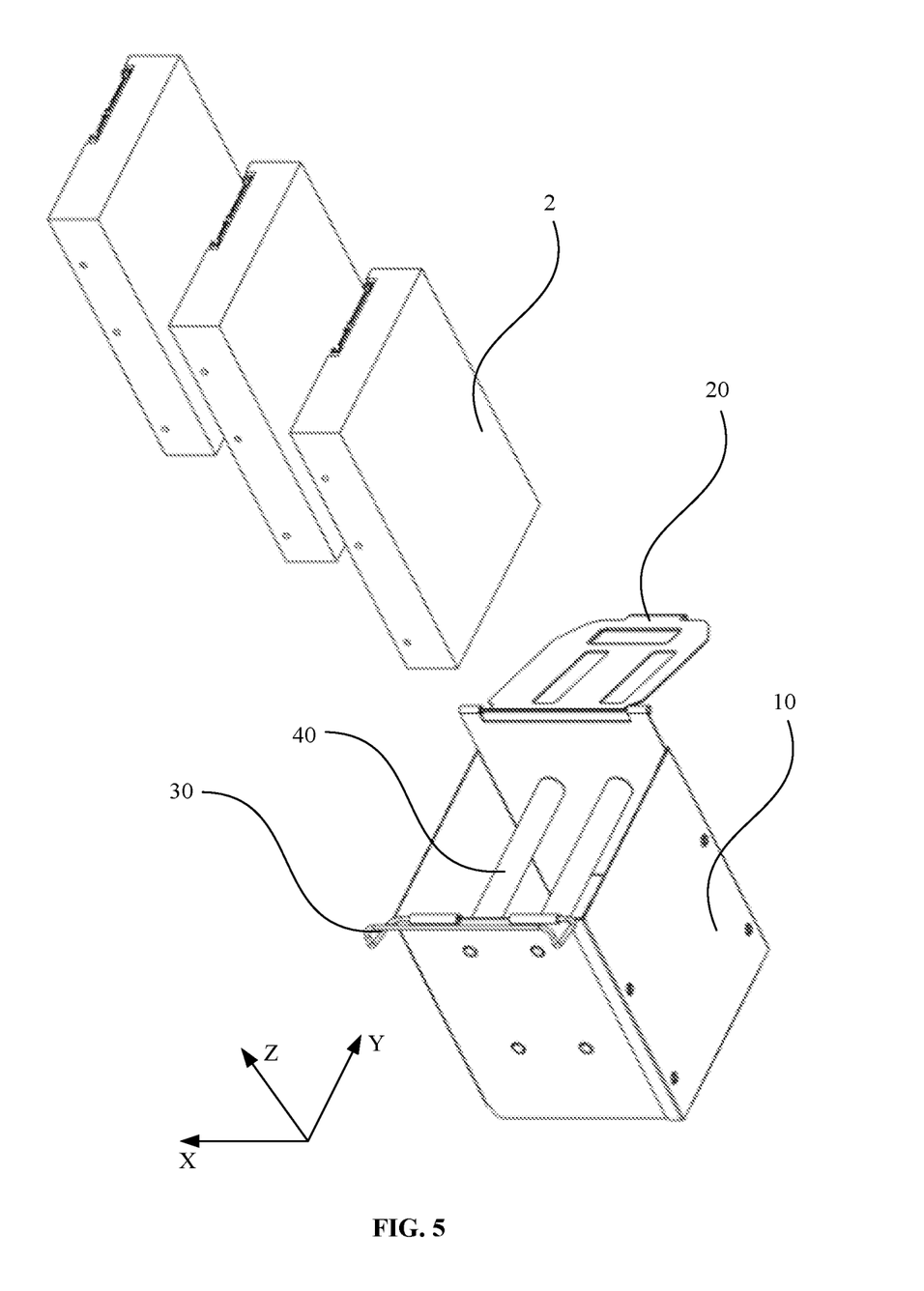
FIG. 5 shows a structural schematic view of the initial state of the hard disk cage assembly provided in an embodiment of the present application.
Figure 6:
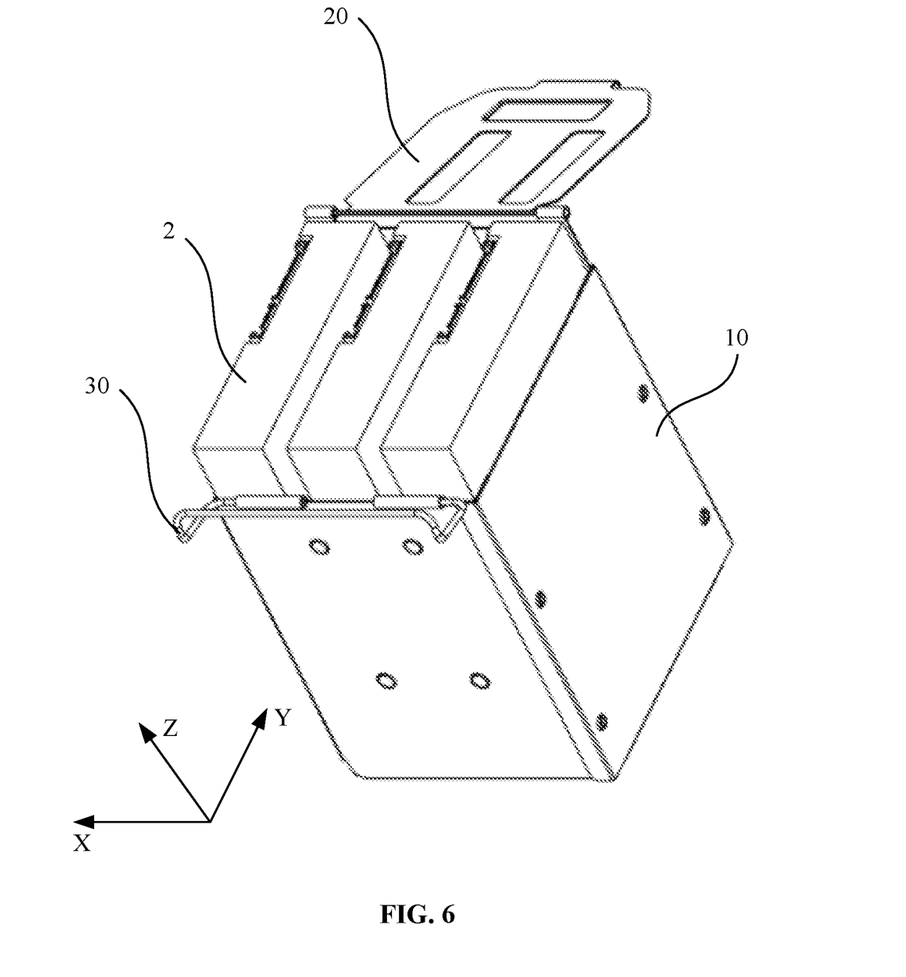
FIG. 6 shows a structural schematic view of the intermediate state of the hard disk cage assembly provided in an embodiment of the present application.
Figure 7:
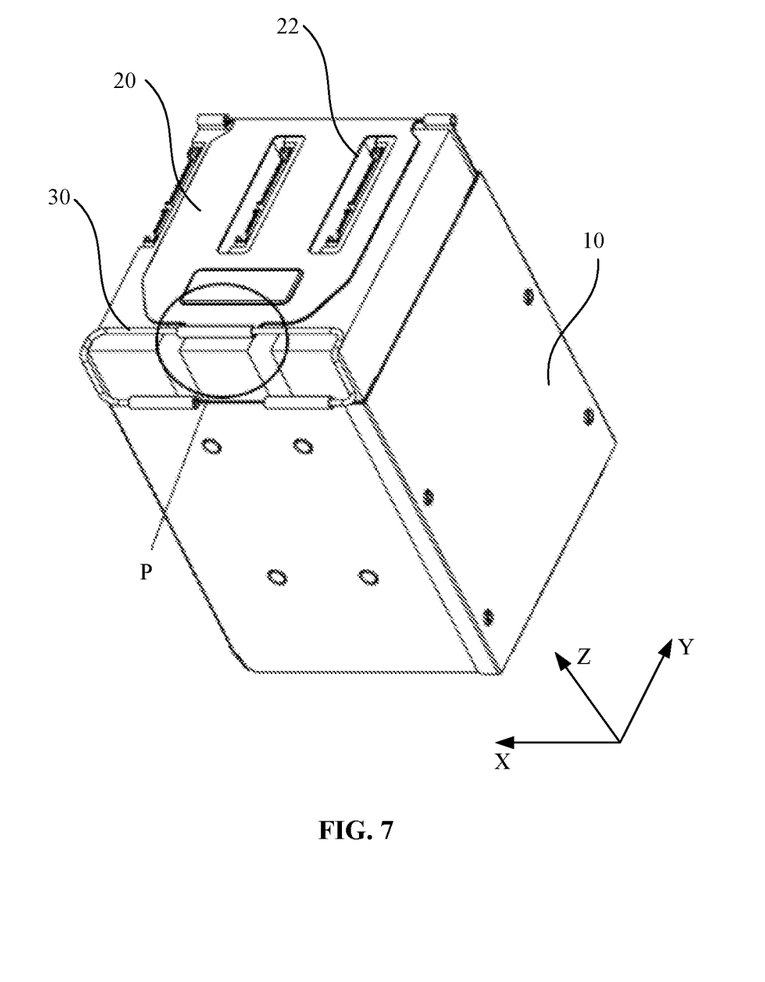
FIG. 7 shows a structural schematic view of a hard disk cage provided in an embodiment of the present application.

With reference to FIGS. 5 to 7, a detailed description is presented below to the process of installing the hard disk in the hard disk fixing device provided in the embodiment of the present application.

First, with reference to FIG. 5, the second end of the baffle 20 and the second end of the snap 30 are opened, both the baffle 20 and the snap 30 rotate relative to the hard disk box 10, and they rotate away from each other in order to open the installation opening. At this point, the bottom of the hard disk 2 faces the installation opening, i.e., the hard disk 2 is vertically inserted into the hard disk box 10.

Second, with reference to FIG. 6, all the hard disks 2 are installed in the hard disk box 10.

Finally, with reference to FIG. 7, both the baffle 20 and the snap 30 rotate relative to the hard disk box 10 and rotate in the direction close to each other so as to close the installation opening, and the second end of the baffle 2 and the second end of the snap 30 are engaged with each other to limit the hard disk 2 in the accommodating cavity. The hard disk 2 can be clamped in the accommodating cavity to prevent the hard disk 2 from shaking in the accommodating cavity. The baffle 20 and the snap 30 act together to prevent the hard disk 2 from being released from the installation opening.

When the hard disk 2 needs to be maintained and repaired, the operation process is opposite to the installation process for the hard disk 2. That is, first the second end of the baffle 20 is disengaged from the second end of the snap 30; then, the baffle 20 and the snap 30 rotate respectively to open the installation opening, and all the hard disks 2 can be removed from the hard disk box 10. Obviously, the operation is easy, convenient, time-saving, effortless and high-efficiency.

The hard disk fixing device in an embodiment of the present application comprises a hard disk box, a baffle and a snap. A first end of the baffle is rotatably installed on a first side edge of the hard disk box, a first end of the snap is rotatably installed on a second side edge of the hard disk box, and a second end of the snap is engaged with a second end of the baffle. As such, the hard disk box, the snap and the baffle form an accommodating cavity to limit the hard disk within the accommodating cavity, and the accommodating cavity can accommodate the hard disk, thereby fixing the hard disk. When the hard disk needs to be removed, simply by disengaging the second end of the snap from the second end of the baffle, the hard disk can be removed from the hard disk box. Therefore, the operation is simple, convenient, time-saving, effortless and high-efficiency.

Figure 9:
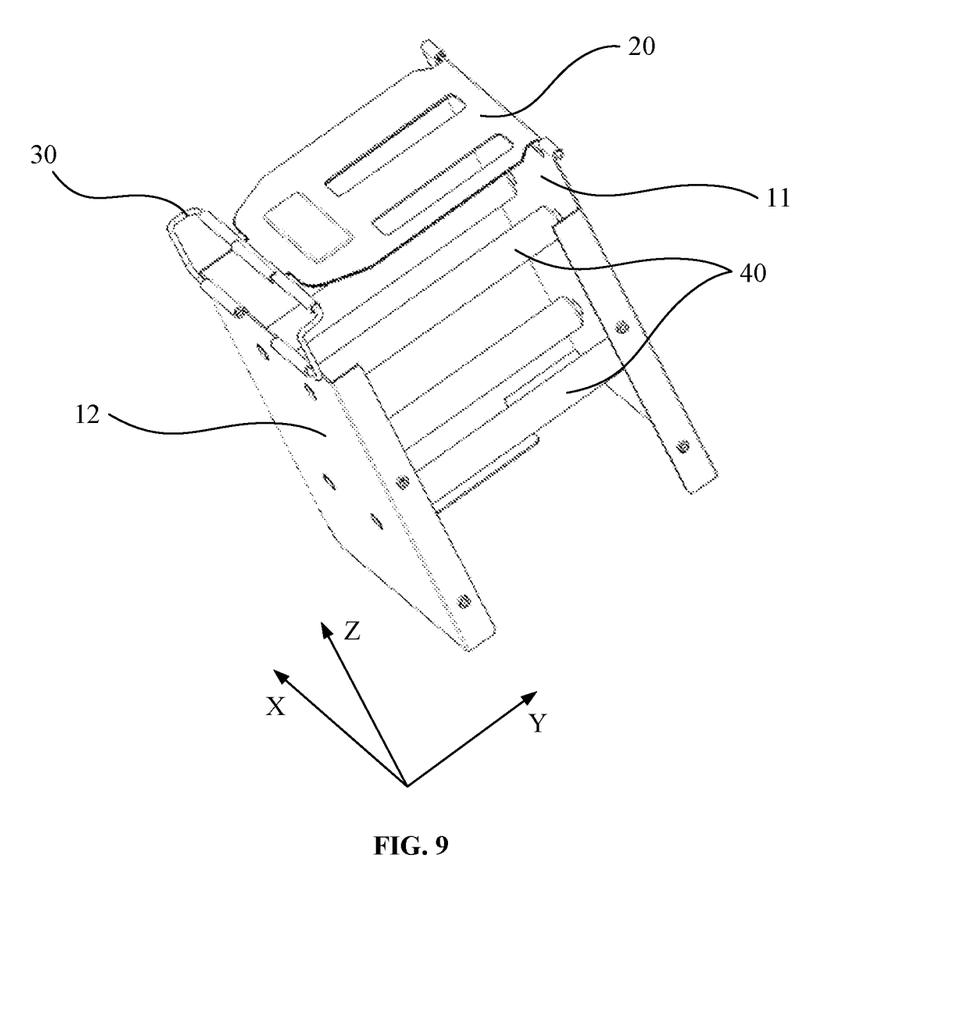
FIG. 9 shows a structural schematic view of a hard disk fixing device in the case where a bottom plate and a third side plate are omitted.

With reference to FIGS. 3 and 9, the hard disk fixing device in the present embodiment further comprises at least one separator. The separator is installed in the accommodating cavity and divides the accommodating cavity into at least two accommodating sub-cavities, and the accommodating sub-cavities can accommodate the hard disk 2.

The separator may be a rectangular plate installed with an elastic cushion, which is parallel to the third side plate 13 of the hard disk box 10 to divide the accommodating cavity into accommodating sub-cavities. The hard disk 2 is clamped in the accommodating sub-cavity under the elastic extrusion of the elastic cushion.

In some embodiments, there is one separator, and the separator divides the accommodating cavity into two accommodating sub-cavities. In other embodiments, there are a plurality of hard disks 2. At this point, a plurality of separators are provided, and the plurality of separators are spaced along a second preset direction, wherein the second preset direction is perpendicular to a first preset direction to be described later. For example, the second preset direction is the direction X in FIG. 3, and the first preset direction is direction Z in FIG. 3. There may be two, three, four, or more separators, and the number of accommodating sub-cavities formed as such is three, four, five or more; that is, the number of accommodating sub-cavities is one more than that of separators. The embodiment of the present application does not limit the number of the separators, and those skilled in the art may flexibly set the number of separators according to practical situations such as the volume of the hard disk box 10, the volume of the hard disk 2, and the installation space of the chassis.

By arranging at least one separator in the accommodating cavity to divide the accommodating cavity into at least two accommodating sub-cavities, the present embodiment can increase the number of hard disks to be installed and flexibly set the structure for clamping the hard disk.

In one possible implementation, the separator comprises at least two elastic shafts 40, which are spaced along the first preset direction; two ends of the elastic shaft 40 are connected with the first side plate 11 and the second side plate 12, respectively; wherein the hard disk box 10 comprises the first side plate 11 and the second side plate 12 which are provided facing each other with a space therebetween. Under the elastic force of the elastic shafts 40, the hard disk 2 can be clamped in the accommodating sub-cavity.

With reference to FIGS. 3 and 9, the elastic shaft 40 extends along the direction Y in the figure, and its first end is connected with the first side plate 11 and its second end is connected with the second side plate 12. The direction Z in the figure is the first preset direction.

The number of elastic shafts 40 included in the separator may be two, three, four or more, and the multiple elastic shafts 40 are spaced along the direction Z, just as shown in FIG. 9. Those skilled in the art may set the number of elastic shafts 40 according to practical situations such as the dimension of the hard disk 2, the dimension of the hard disk box 10, etc.

In the present embodiment, the separator comprises at least two elastic shafts 40. While the hard disk 2 is clamped by the elastic force of the elastic shafts 40, the elastic shafts 40 have a space therebetween, which can improve the heat dissipation capability of the hard disk 2. In addition, the contact area between the elastic shaft 40 and the hard disk 2 is small, so the friction force between the hard disk 2 and the elastic shaft 40 is small, which facilitates the insertion and removal of the hard disk 2.

Figure 4:
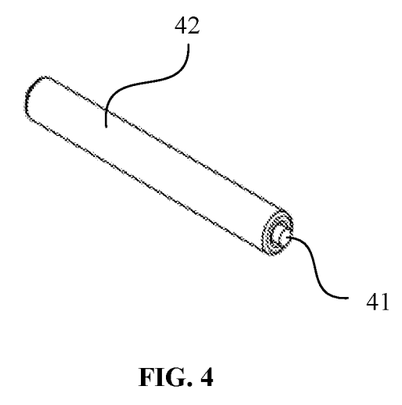
FIG. 4 shows a structural schematic view of an elastic rotating shaft of a hard disk fixing device provided in an embodiment of the present disclosure.

There are various structures of the elastic shaft 40. For example, the elastic shaft 40 may be a single elastic shaft, such as a rubber shaft, a silicone shaft, or the like, which has a simple structure and can be conveniently processed. For another example, with reference to FIG. 4, the elastic shaft 40 comprises a rotating shaft 41 and an elastic sleeve 42 sleeved on the outer side of the rotating shaft 41, wherein the rotating shaft 41 is a rigid shaft, such as a metal shaft; the elastic sleeve 42 is an elastic sleeve structure such as a rubber sleeve, a silicone sleeve, a sponge sleeve, or the like. Two ends of the rotating shaft 41 are connected with the first side plate 11 and the second side plate 12, respectively. Thereby, the two ends of the rotating shaft 41 are connected onto the first side plate 11 and the second side plate 12, and the hard disk 2 is clamped in the accommodating sub-cavity under the action of the elastic force of the elastic sleeve 42. The structure is simple and can be conveniently disassembled and assembled. After the structure of the elastic sleeve 42 is aged, only the elastic sleeve 42 needs to be replaced without replacing the rotating shaft 41, which saves maintenance costs.

There may be various ways for the rotating shaft 41 to be connected with the first side plate 11 and the second side plate 12.

In some possible implementations, the elastic sleeve 42 is rotatably sleeved on the outer side of the rotating shaft 41, and two ends of the rotating shaft 41 are firmly connected with the first side plate 11 and the second side plate 12, respectively. The inner diameter of the elastic sleeve 42 is larger than the outer diameter of the rotating shaft 41; that is, when the elastic sleeve 42 is sleeved on the rotating shaft 41, there is a space between the inner wall of the elastic sleeve 42 and the rotating shaft 41, so that the elastic sleeve 42 can rotate relative to the rotating shaft 41. The two ends of the rotating shaft 41 are fixed on the first side plate 11 and the second side plate 12, respectively. For example, the first side plate 11 and the second side plate 12 are provided with through holes, the two ends of the rotating shaft 41 are provided with threaded holes respectively, and the screws pass through the through holes and are threadedly connected to the threaded holes at the end of the rotating shaft 41. For another example, the two ends of the rotating shaft 41 are provided with studs respectively, and the studs pass through the through holes and then are connected with nuts, so as to realize the firm connection between the two ends of the rotating shaft 41 and the first side plate 11 and the second side plate 12, respectively. In the present implementation, the rotating shaft 41 is fixed relative to the first side plate 11 and the second side plate 12, the elastic sleeve 42 rotates relative to the rotating shaft 41, and when inserting and removing the hard disk 2, the elastic sleeve 42 rotates relative to the rotating shaft, which improves the convenience of operation.

In other possible implementations, the first side plate 11 is provided with a first installation hole, the second side plate 12 is provided with a second installation hole, and the two ends of the rotating shaft 41 are rotatably installed in the first installation hole and the second installation hole 122, respectively. At this point, the elastic sleeve 42 may be fixed on the rotating shaft 41, e.g., the elastic sleeve 42 is interference-connected with the rotating shaft 41; the elastic sleeve 42 may also rotate relative to the rotating shaft 41. The first installation hole may be a circular hole provided on the first side plate 11. The second installation hole may be a circular hole provided on the second side plate 12. The two ends of the rotating shaft 41 penetrate the first installation hole and the second installation hole 122, respectively, so as to cause the rotating shaft 41 to rotate relative to the hard disk box 10. Alternatively, the two ends of the rotating shaft 41 are provided with pin holes respectively, wherein one pin penetrates the first installation hole to be connected with the pin hole on one end of the rotating shaft 41, and cab rotate relative to the first installation hole; and the other pin penetrates the second installation hole 122 to be connected with the pin hole on the other end of the rotating shaft 41, and can also rotate relative to the second installation hole 122. In the present implementation, the two ends of the rotating shaft 41 are rotatably installed on the first side plate 11 and the second side plate 12, respectively, which can increase the operation convenience of inserting and removing the hard disk 2 into or from the accommodating sub-cavity. Moreover, the structure of the elastic shaft 40 is simple, and the installation thereof is convenient.

It is noteworthy that when the rotating shaft 41 is installed on the first side plate 11 and the second side plate 12 through pins and screws, the outer end faces of the heads of the screws and the pins are aligned with the outer surfaces of the first side plate 11 and the second side plate 12. For example, the outer surfaces of the first side plate 11 and the second side plate 12 are provided with recesses, so as to prevent the protruding heads of the screws and pins from affecting the installation of other components in the chassis.

As one possible implementation of the rotatable connection between the first side edge 111 and the baffle 20, the first side edge 111 is hinged with the first end of the baffle 20. For example, the first side edge 111 is hinged with the baffle 20 through a hinge. For another example, the first side edge 111 is provided with two first shaft sleeves 112 with a space therebetween along the direction X, the first end of the baffle 20 is provided with two first hinge shafts with a space therebetween along the direction X, and the two first hinge shafts penetrate the two first shaft sleeves 112, respectively, thereby realizing the hinged connection between the first side edge 111 and the first end of the baffle 20. Of course, the first hinge shaft may be provided on the first side edge 111, and accordingly, the first shaft sleeve 112 is provided on the first end of the baffle 20.

As one possible implementation of the rotatable connection between the second side edge 121 and the snap 30, the second side edge 121 is hinged with the first end of the snap 30. For example, the second side edge 121 is hinged with the snap 30 through a hinge. For another example, the second side edge 121 is provided with two second shaft sleeves 113 with a space therebetween along the direction X, the first end of the snap 30 is provided with two second hinge shafts with a space therebetween along the direction X, and the two second hinge shafts penetrate the two second shaft sleeves 123, respectively, thereby realizing the hinged connection between the second side edge 121 and the first end of the snap 30. Of course, the second hinge shaft may be provided on the second side edge 121, and accordingly, the second shaft sleeve 123 is provided on the first end of the snap 30.

Of course, in the present application, the way of rotatable connection between the first side edge 111 and the baffle 20 may be either the same as or different from that between the second side edge 121 and the snap 30. For example, when the first side edge 111 is hinged with the first end of the baffle 20, the second side edge 121 may be connected with the first end of the snap 30 through a hinge so as to cause the snap 30 to rotate relative to the second side edge 121. For another example, when the second side edge 121 is hinged with the first end of the snap 30, the first side edge 111 is connected with the first end of the baffle 30 through a hinge.

In one impossible implementation, the first side edge 111 is hinged with the first end of the baffle 20, and the second side edge 121 is hinged with the first end of the snap 30, so that while the baffle 20 can rotate relative to the snap 30, the hard disk fixing device has a simple structure and can be conveniently assembled.

There are various structures of engagement between the second end of the snap 30 and the second end of the baffle 20. For example, one of the second ends of the snap 30 and the baffle 20 is a hook, and the other is a snap that is engaged with the hook.

When the second end of the snap 30 is a hook, the second end of the baffle 20 is a snap. When the second end of the snap 30 is a snap, the second end of the baffle 20 is a hook. For example, with reference to FIGS. 3, 7 and 8, the second end of the baffle 20 is provided with a hook 21, and the opening of the hook 21 faces the first end of the baffle 20. Accordingly, the snap 30 is provided with an engagement portion 34 that is a round rod. When the round rod snaps into the hook 21, the second end of the snap 30 is engaged with the second end of the baffle 20.

Still with reference to FIG. 3, a detailed description is presented below to the structure of the snap 30. The snap 30 is a structure formed by bending a round rod. The snap 30 comprises a hinge portion 31, and the hinge portion 31 is hinged with the second shaft sleeve 123. The hinge portion 31 is bent away from the hard disk box 10 and then extends to form an avoiding portion 32 to avoid the hard disk 2. The avoiding portion 32 is bent towards the baffle 20 and extends to form a connecting portion 33. The connecting portion 33 extends towards the fourth side plate 14 of the hard disk box 10 to form the engagement portion 34. Taking the center of the hook 21 as the axis of symmetry, the right half of the snap 30 comprises the hinge portion 31, the avoiding portion 32, the connecting portion 33 and the engagement portion 34, and the left half of the snap 30 is symmetrical with its right half.

In addition, the first side plate 11 of the hard disk box 10 extends upwards to form the first side edge 111. That is, with reference to FIG. 7, the hard disk box 10 protrudes from the top of the hard disk 2. The avoiding portion 32 and the connecting portion 33 of the snap 30 can also be used to limit and protect the hard disk 2.

Still with reference to FIG. 3, to facilitate the installation of a hard disk connector, the baffle 20 is provided with an avoiding opening 22 for avoiding the hard disk connector. Those skilled in the art sets the number and shape of the avoiding opening 22 according to the number of the hard disks 2 and the type of the hard disk connector.

With reference to FIG. 7, the left side and the right side of the baffle 20 are both located in the installation opening. That is, the tops of the hard disk 2 close to the third side plate 13 and the fourth side plate 14 are exposed outside the hard disk box 10, which helps to improve the heat dissipation performance of the hard disk 2.

Figure 8:
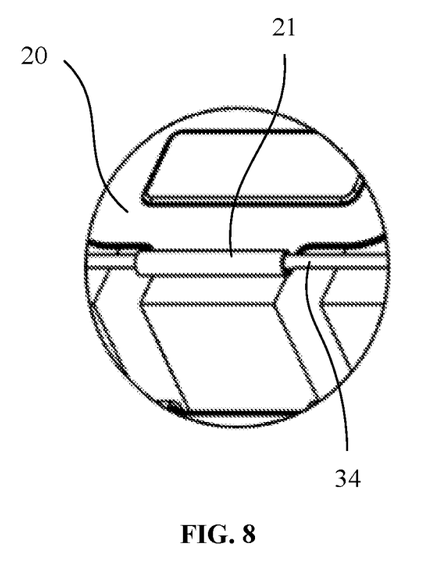
FIG. 8 shows an enlarged schematic view of P in FIG. 7.

With reference to FIGS. 5 and 8, an embodiment of the present application further provides a hard disk cage, which comprises the above hard disk fixing device and at least one hard disk 2, wherein the hard disk 2 is accommodated in an accommodating cavity of the hard disk fixing device.

In the embodiment, the hard disk 2 may be of an existing hard disk type, which is not limited here. The structure, function and effect of the hard disk fixing device provided in the present embodiment are the same as those in the above embodiment. For details, please refer to the above embodiment, which is not detailed here.

With the above hard disk fixing device, the hard disk cage provided in the embodiment of the present application also has the same advantages as the above hard disk fixing device.

An embodiment of the present application further provides an apparatus having a storage function, which comprises a chassis and the above hard disk cage, wherein the hard disk cage is fixed in the chassis. The apparatus may be a server, a computer, or the like, which is not defined here. The chassis may be a rectangular metal cabinet. The hard disk cage may be fixed in the chassis through screws, or the hard disk cage may be engaged at a preset position of the chassis. The structure, function and effect of the hard disk cage provided in the present embodiment are the same as those in the above embodiment. For details, please refer to the above embodiment, which is not detailed here.

With the above hard disk cage, the apparatus having a storage function provided in the embodiment of the present application also has the same advantages as the above hard disk cage.

In the description of the present application, it should be understood that the terms "first" and "second" are only used for illustrative purpose and cannot be interpreted as indicating or implying relative importance or implying the number of the indicated technical features. Thereby, features as defined with "first" and "second" may explicitly or implicitly comprise at least one of the features. In the description of the present application, the term "multiple" or "a plurality of" means at least two, e.g., two, three, or more, unless otherwise expressly and specifically defined.

In the foregoing description, descriptions with reference to the term "one embodiment", "some embodiments", "example", "specific example", "some examples" or the like mean that a specific feature, structure, material or characteristic described in connection with the embodiment or example is included in at least one embodiment or example of the present application. In the present specification, schematic expressions of the above terms do not necessarily refer to the same embodiment or example. Moreover, the specific feature, structure, material or characteristic described herein may be combined appropriately in any one or more embodiments or examples. Furthermore, those skilled in the art may incorporate and combine different embodiments or examples described in the present specification as well as features of different embodiments or examples, without conflicting each other.

Finally, it is noteworthy that the foregoing embodiments are only used for illustrating the technical solutions of the present application rather than limiting. Although the present application has been illustrated in detail with reference to the foregoing embodiments, those of ordinary skill in the art should understand that they can still modify the technical solutions described in the foregoing embodiments or perform equivalent substitutions on some or all of the technical features therein. These modifications or substitutions do not make the essence of the corresponding technical solution depart from the scope of the technical solutions in the various embodiments of the present application.

What is claimed is:

1. A hard disk fixing device, comprising:
   a hard disk box, wherein one side of the hard disk box is provided with an installation opening, as well as a first side edge and a second side edge which are oppositely arranged and spaced by the installation opening;
   a baffle, wherein a first end of the baffle is rotatably installed on the first side edge; and
   a snap, wherein a first end of the snap is rotatably installed on the second side edge, and a second end of the snap is engaged with a second end of the baffle, such that the hard disk box, the baffle and the snap form an accommodating cavity that can accommodate a hard disk,
   wherein the hard disk fixing device further comprises at least one separator, the separator is installed in the accommodating cavity and divides the accommodating cavity into at least two accommodating sub-cavities, and the accommodating sub-cavity can accommodate the hard disk, wherein the hard disk is clamped in the accommodating cavity.

2. The hard disk fixing device according to claim 1, wherein the hard disk box comprises a first side plate and a second side plate which face each other with a space therebetween;
   the separator comprises at least two elastic shafts, the at least two elastic shafts being arranged with a space therebetween along a first preset direction; two ends of the elastic shaft are connected with the first side plate and the second side plate, respectively; and
   under the action of the elastic force of the elastic shafts, the hard disk can be clamped in the accommodating sub-cavity.

3. The hard disk fixing device according to claim 2, wherein the elastic shaft comprises a rotating shaft and an elastic sleeve sleeved on the outer side of the rotating shaft, two ends of the rotating shaft being connected with the first side plate and the second side plate, respectively.

4. The hard disk fixing device according to claim 3, wherein the elastic sleeve is rotatably sleeved on the outer side of the rotating shaft, and two ends of the rotating shaft are firmly connected with the first side plate and the second side plate, respectively; or
   the first side plate is provided with a first installation hole, the second side plate is provided with a second installation hole, and two ends of the rotating shaft are rotatably installed in the first installation hole and the second installation hole, respectively.

5. The hard disk fixing device according to claim 2, wherein a plurality of separators are provided, the plurality of separators being arranged with a space therebetween along a second preset direction; and the second preset direction is perpendicular to the first preset direction.

6. The hard disk fixing device according to claim 1, wherein one of the second end of the snap and the second end of the baffle is a hook, and the other of the second end of the snap and the second end of the baffle is a snap which is engaged with the hook.

7. The hard disk fixing device according to claim 1, wherein the baffle is provided with an avoiding opening to avoid a hard disk connector.

8. A hard disk cage, comprising a hard disk fixing device according to claim 1 and at least one hard disk, wherein the hard disk is accommodated in an accommodating cavity of the hard disk fixing device.

9. An apparatus having a storage function, comprising a chassis and a hard disk cage according to claim 8, wherein the hard disk cage is fixed in the chassis.

* * * * *